(No Model.)
S. J. LYNN.
CHEESE COVER.
No. 460,441. Patented Sept. 29, 1891.
Fig. 1.
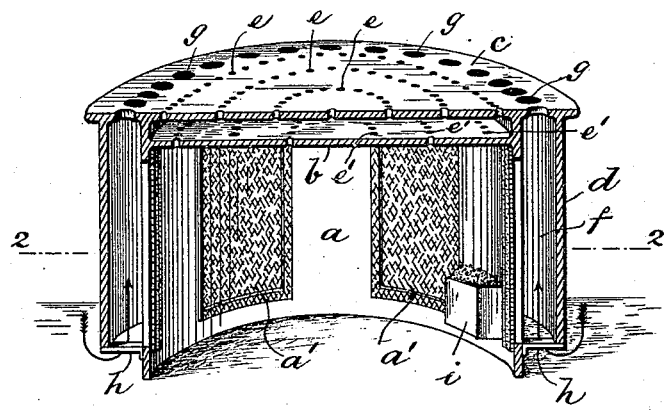
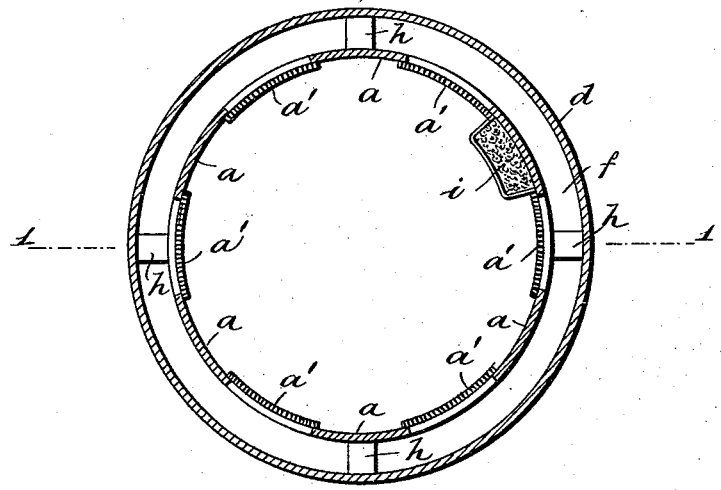
Fig. 2.
WITNESSES:
H. Walker
C. Sedgwick
INVENTOR:
S. J. Lynn
BY
Munn & Co
ATTORNEYS

UNITED STATES PATENT OFFICE.

STROTHER J. LYNN, OF HOPE, KANSAS.

CHEESE-COVER.

SPECIFICATION forming part of Letters Patent No. 460,441, dated September 29, 1891.

Application filed September 9, 1890. Serial No. 364,410. (No model.)

*To all whom it may concern:*

Be it known that I, STROTHER J. LYNN, of Hope, in the county of Dickinson and State of Kansas, have invented a new and useful Improvement in Cheese-Covers, of which the following is a full, clear, and exact description.

This invention relates to an improved cover for cheese in the cake, which is cut as required to supply the demands of the retail trade; and it has for its objects to provide a removable cover which will protect the cheese after having been cut from flies, insects, and dust, and which affords ventilation to prevent mold, and is provided with means for keeping the cheese in salable condition and preventing shrinkage in bulk or loss in weight.

To these ends the invention consists in the construction of parts and their combination, as hereinafter described, and indicated in the claims.

Reference is to be had to the accompanying drawings, forming a part of this specification, in which similar letters of reference indicate corresponding parts in both the figures.

Figure 1 is a vertical section of the device, taken on the line 1 1 in Fig. 2; and Fig. 2 is a horizontal section taken on the line 2 2 in Fig. 1.

The device consists, essentially, of a circular inner casing and a concentric outer cover, the first-named being made of proper dimensions from any suitable material, preferably tin-plate and apertured in its side wall $a$ at spaced intervals, and over said apertures, which may be of any desired size and shape, wire-gauze screens $a'$ are secured. A sheet-metal top wall $b$ is peripherally secured to the inner surface of the side wall $a$ of the casing a short distance below the upper edge of said side wall, which latter is attached to the lower surface of a parallel outer top piece $c$, that is extended uniformly beyond the side wall $a$ and is united to the upright wall $d$ of the outer cover, which is thus secured at a proper distance from the wall $a$ and concentric with it.

In both the top wall $b$ and parallel top piece $c$ are formed numerous circularly-arranged perforations $e$ $e'$, which are small enough to prevent the intrusion of insects, and to avoid the entrance of dust through said perforations those $e$ in the outer top piece are located between those $e'$ in the inner top wall $b$, as shown in Fig. 1.

The outer wall $d$ is made of less height than the inner wall $a$, thus providing for entrance of air to an annular space $f$, produced between the walls $a$ and $d$, and in the top piece $c$ is formed a series of perforations $g$ of sufficient size to afford a free draft of air in the annular space $f$, with which said perforations communicate.

At proper intervals stay-pieces $h$, made of sheet metal or wire rod, are secured between the lower edges of the outer wall $d$ and inner wall $a$, so as to stiffen the outer wall and render the structure substantial.

Within the chamber afforded by the inner side wall $a$ a small pocket $i$ is preferably affixed to the inner surface of said side wall for the reception of a moistened sponge or any other porous material that will absorb and hold water.

The cheese is placed on the usual base-board, which may be made revoluble, if found desirable, and the cheese-cover is placed over it, resting with its lower edge on the base-board, and as there is ample provision for retaining the cheese in a moist condition, while free ventilation is provided, the cut cheese will remain salable until the entire cake is disposed of, and no loss from shrinkage or injury from mold, dust, or flies is permitted when this cover is used.

Having thus fully described my invention, I claim as new and desire to secure by Letters Patent—

1. A cheese-cover having two concentric side walls, the inner side wall having a reticulated portion and a double foraminated top wall, and the chamber formed by the side walls being provided with a single foraminated top wall, the two concentric side walls being stayed at their lower ends by braces and the outer wall shortened, substantially as described.

2. A cheese-cover having two concentric side walls forming a chamber, the outer one being the shorter and the top wall of the chamber being apertured, the chamber formed by the inner wall having double foraminated top walls, the perforations of the inner top wall being out of line with those of the outer wall, substantially as described.

STROTHER J. LYNN.

Witnesses:
HARRY L. IRWIN,
J. W. HIGGINS, Jr.